US008236200B2

(12) United States Patent
Sweeney et al.

(10) Patent No.: US 8,236,200 B2
(45) Date of Patent: *Aug. 7, 2012

(54) NANO-COMPOSITE IR WINDOW AND METHOD FOR MAKING SAME

(75) Inventors: Sean Michael Sweeney, Schenectady, NY (US); Sergio Martins Loureiro, Saratoga Springs, NY (US); Timothy Yosenick, Greenfield, NY (US)

(73) Assignee: General Electric Company, Niskayuna, NY (US)

( * ) Notice: Subject to any disclaimer, the term of this patent is extended or adjusted under 35 U.S.C. 154(b) by 1123 days.

This patent is subject to a terminal disclaimer.

(21) Appl. No.: 11/634,592

(22) Filed: Dec. 6, 2006

(65) Prior Publication Data
US 2009/0283720 A1 Nov. 19, 2009

(51) Int. Cl.
C09K 11/02 (2006.01)
C09K 11/08 (2006.01)
C09K 11/77 (2006.01)
G02B 5/08 (2006.01)
G06K 7/10 (2006.01)

(52) U.S. Cl. .......... 252/301.4 R; 252/301.4 F; 264/604; 264/621; 359/350; 359/599; 977/773

(58) Field of Classification Search ............ 252/301.4 F, 252/301.4 R; 264/604, 621, 651, 645, 661; 977/773; 428/472; 501/152; 427/555; 359/350, 359/599
See application file for complete search history.

(56) References Cited

U.S. PATENT DOCUMENTS

| | | | |
|---|---|---|---|
| 4,571,312 A | 2/1986 | Greskovich | |
| 5,418,196 A * | 5/1995 | Niihara | 501/87 |
| 5,431,967 A * | 7/1995 | Manthiram et al. | 427/555 |
| 5,484,750 A | 1/1996 | Greskovich | |
| 6,979,415 B1 | 12/2005 | Krishna et al. | |
| 7,056,849 B2 | 6/2006 | Wan et al. | |
| 7,282,259 B2 | 10/2007 | Ku et al. | |
| 7,311,859 B1 | 12/2007 | Loureiro et al. | |
| 2005/0112389 A1* | 5/2005 | Loureiro et al. | 428/472 |
| 2006/0084566 A1 | 4/2006 | Wan et al. | |
| 2006/0100088 A1* | 5/2006 | Loureiro et al. | 501/152 |
| 2006/0133978 A1 | 6/2006 | Williams et al. | |
| 2007/0120298 A1 | 5/2007 | Ku et al. | |
| 2010/0027105 A1* | 2/2010 | Sweeney et al. | 359/356 |

OTHER PUBLICATIONS

Apetz, Rolf et al "Transparent Alumina: A Light-Scattering Model," *J. Am. Ceram. Soc.* (2003) 86[3] 480-86.
Bohren, C.F. and Huffman, D.R. *Absorption and Scattering of Light by Small Particles*, New York: John Wiley & Sons (1983) 474-89.
Budiansky, B.; Amazigo, J.C.; Evans, A.G. "Small-scale Crack Bridging and the Fracture Toughness of Particulate-reinforced Ceramics," *J. Mech. Phys. Solids* (1988) 36:167-87.
Carroll, L. et al. "Silicon Carbide Particle Size Effects in Alumina-Based Nanocomposites" *Acta mater* (1996) vol. 44, No. 11, pp. 4543-4552.
Chaim, Rachman et al "Erratum: "Transparent nanocrystalline MgO by rapid and low-temperature spark plasma sintering" [J. Mater. Res., 19, 2527 (2004)]" *J. Mater. Res.*, vol. 19, No. 12 (2004) p. 3715.
Chaim, Rachman et al "Transparent nanocrystalline MgO by rapid and low-temperature spark plasma sintering" *J. Mater. Res.* (2004) vol. 19, No. 9, pp. 2527-2531.
Di Antonio, Christopher B. et al. "Extension of Master Sintering Curve Theory to Organic Decomposition" *J. Am. Ceram. Soc.* (2005) vol. 88[10], pp. 2722-2728.
Diop, Julie Claire "Nano Ceramics" *Technology Review*, Dec. 2002/Jan. 2003, 1 p.
Duclos, Steven J. et al. "Development of the HiLight™ scintillator for computed tomography medical imaging" 4 p.
Faber, K.T. and Evans, A.G. "Crack Deflection Processes" *Acta Metal.* (1983) 31:565-76.
Górny, Gabriela et al. "Microstructure-property relationship in $B_4C$-$\beta SiC$ materials" *Solid State Ionics* (1997) vol. 101-103, pp. 953-958.
Harris, D.C. "Frontiers in infrared window and dome materials," *Proceedings of SPIE—The International Society for Optical Engineering* (1995) 2552:325-35.
Harris, D.C. "History of development of polycrystalline optical spinel in the U.S.," *Proceedings of SPIE v. 5786: Window and Dome Technologies and Materials IX*, ed. by Tustison, R.W., Bellingham, WA: The International Society for Optical Engineering (2005) 1-22.
Harris, D.C. "Properties of diamond for window and dome applications," *Proceedings of SPIE—The International Society for Optical Engineering* (1994) 2286:218-28.
Harris, Daniel C., Materials for Infrared Windows and Domes *Properties and Performance*, 1999, pp. 17, 105, 117, 322-325, 352 & 354, SPIE—The International Society for Optical Engineering, Bellingham, Washington, USA. Huie, J. and Gentilman, R. "Characterization of Transparent Polycrystalline Yttrium Aluminum Garnet (YAG) Fabricated from Nano-Powder," *Proceedings of SPIE v. 5786: Window and Dome Technologies and Materials IX*, ed.By Tustison, R.W., Bellingham, WA: The International Society for Optical Engineering (2005) 251-57.
Ikesue, A. and Yan Lin Aung "Synthesis and Performance of Advanced Ceramic Lasers" *J. Am. Ceram. Soc.* (2006) vol. 00, No. 0, pp. 1-9.

(Continued)

*Primary Examiner* — Bijan Ahvazi
(74) *Attorney, Agent, or Firm* — Fletcher Yoder, P.C.

(57) ABSTRACT

A transparent, nano-composite material and methods for making structures from this material are provided. In one embodiment, the material is made from a polycrystalline matrix containing dispersed particles of a harder material. The particles are less then about 100 nm. In other embodiments, methods for making structures from the material are provided. In one aspect, the methods include blending precursor powders for the matrix and reinforcing phases prior to forming and sintering to make a final structure. In other aspects, a precursor powder for the matrix is pressed into a green shape, which is partially sintered and exposed to a solution containing a precursor for the reinforcing phase, prior to be sintered into the final material. In another aspect, the precursor powder for the matrix is coated with a sol-gel precursor for the reinforcing material, then pressed into a green shape and sintered to form the final structure.

18 Claims, 3 Drawing Sheets

OTHER PUBLICATIONS

Kear, B. H.; Sadangi, R.; Shukla, V.; Stefanik, T.; Gentilman, R. "Submicron-grained transparent yttria nanocomposites," *Proceedings of SPIE v. 5786: Window and Dome Technologies and Materials IX*, ed. by Tustison, R.W., Bellingham, WA: The International Society for Optical Engineering (2005) 227-33.

Krell, Andreas "Fracture Origin and Strength in Advanced Pressureless-Sintered Alumina" *J. Am. Ceram. Soc.* (1998) 81[7], pp. 1900-1906.

Krell, Andreas "Transparent Sintered Corundum with High Hardness and Strength" *J. Am. Ceram. Soc.* (2003) vol. 86, No. 1, pp. 12-18.

Lim, S.H.N. et al. "Minimisation of intrinsic stress in titanium nitride using a cathodic arc with plasma immersion ion implantation" *Surface and Coatings Technology* (2003) vol. 174-175, pp. 76-80.

Navias, Louis "Preparation and Properties of Spinel Made by Vapor Transport and Diffusion in the System $MgO-Al_2O_3$," *J. Am. Ceram. Soc.*, Sep. 1961, vol. 44, No. 9, pp. 434-446.

Niihara, Koichi "New Design Concept of Structural Ceramics" *Journal of the Ceramic Society of Japan, Int. Edition* (1991) vol. 99, No. 10, pp. 945-952.

Ohji, Tatsuki et al. "Strengthening and Toughening Mechanisms of Ceramic Nanocomposites" *J. Am. Ceram. Soc.* (1998) vol. 81, No. 6, pp. 1453-1460.

Ortiz-Merino, José L. et al. "Relationship between wear rate, surface pullout and microstructure during abrasive wear of alumina and alumina/SiC nanocomposites" *Acta Materialia* (2005) vol. 53, pp. 3345-3357.

Palik, E.D., ed., "Silicon Carbide (SiC)", *Handbook of Optical Constants of Solids III*, pp. 587-595, San Diego: Academic Press, Inc. (1998).

Patscheider, Jörg "Nanocomposite Hard Coatings for Wear Protection" *MRS Bulletin* (2003) pp. 180-183.

Pezzotti, Giuseppe et al. "Strengthening mechanisms in $Al_2O_3$/SiC nanocomposites" *Computational Materials Science* (2001) vol. 22, pp. 155-168.

Philipp, H.R., "Silicon Nitride $(Si_3N_4)$", Handbook of Optical Constants of Solids, (1985) pp. 771-774, Academic Press, Inc.

Rodríguez, Jesús et al. "Sliding Wear of Alumina/Silicon Carbide Nanocomposites" *J. Am. Ceram. Soc.* (1999) vol. 82, No. 8, pp. 2252-2254.

Sawaguchi, Akihiro et al. "Mechanical and Electrical Properties of Silicon Nitride-Silicon Carbide Nanocomposite Material" *J. Am. Ceram. Soc.* (1991) vol. 74, No. 5, pp. 1142-1144.

Sengupta, S.; Revur, R.R.; Schorr, J.R.; Adair, J.; Szepesi, C. "Methods for fabrication of IR windows from nanoparticulates," *Proceedings of SPIE v. 5786: Window and Dome Technologies and Materials IX*, ed. by Tustison, R.W., Bellingham, WA: The International Society for Optical Engineering (2005) 206-16.

Slack, G. A. "Advanced Materials for Optical Windows" *General Electric—Technical Information Series* (1979) No. 79CRD071, pp. 1-45.

Sweeney, S.M., *Permeability, Drying, and Sintering of Pressure Filtered Ceramic Nanopowders*, Ph.D. thesis, The Pennsylvania State U., University Park, PA, (2005) pp. 125-126, 224-245.

Taya, Minoru et al. "Toughening of a Particulate-Reinforced Ceramic-Matrix Composite by Thermal Residual Stress" *J. Am. Ceram. Soc.* (1990) vol. 73, No. 5, pp. 1382-1391.

Van de Hulst, H.C. *Light Scattering by Small Particles*, New York: John Wiley & Sons, Inc. (1957) 93-98, 297-26.

Voevodin, A. A. et al. "Tribological properties of adaptive nanocomposite coatings made of yttria stabilized zirconia and gold" *Surface and Coatings Technology* (2001) vol. 146-147, pp. 351-356.

Voevodin, A. A. et al. "Nanocomposite tribological coatings with "chameleon" surface adaption" *J. Vac. Sci. Technol.* (2002) vol. A 20, No. 4, pp. 1434-1444.

Wahl, J.M.; Hartnett, T.M.; Goldman, L.M.; Twedt, R.; Warner, C. "Recent Advances in ALON™ Optical Ceramic," *Proceedings of SPIE v. 5786: Window and Dome Technologies and Materials IX*, ed. by Tustison, R.W., Bellingham, WA: The International Society for Optical Engineering (2005) 71-82.

Wang, Xiao-Hui et al. "Two-Step Sintering of Ceramics with Constant Grain-Size, I. $Y_2O_3$," *J. Am. Ceram. Soc.* (2006) vol. 89, No. 2, pp. 431-437.

Weber, M.J., "Section 1: Crystalline Materials", *Handbook of Optical Materials*, Boca Raton: CRC Press 2003, pp. 35-36, 38-40, 47, 63-66, 69, 76, 83, 85, 87, 88.

Wolff, M. and Clasen, R., "Fabrication of Transparent Polycrystalline Zirconia Ceramics", *CFI Ceramic Forum International*, (2005) 82:E49.

Xiong, Yan et al. "Fabrication of transparent AlN ceramics" *J. Hater Sci.* (2006) vol. 41, pp. 2537-2539.

Yamada, Suzuya et al. "$B_4C$-$CrB_2$ composites with improved mechanical properties" *Journal of the European Ceramic Society* (2003) vol. 23, pp. 561-565.

Zhang, G.F.; Zheng, X.; Guo, L.J .; Liu, Z.T. and Xiu, N. K. "Influence of deposition parameters on the refractive index and growth rate of diamond-like carbon films." *Surface & Coatings Technology* (1994) 64:127-30.

Zhang, G. F. et al. "Optical transmittance of antireflective diamond-like coatings on ZnS substrates" *Surface and Coatings Technology* (1996) vol. 82, pp. 110-113.

\* cited by examiner

NANO-COMPOSITE IR WINDOW AND METHOD FOR MAKING SAME

BACKGROUND

The invention relates generally to transparent nano-composite materials and their production. More specifically, the invention relates to the production and use of a transparent, nano-particle reinforced ceramic, such as structures suitable for use in windows for optically guided armaments.

Many modern armaments use optical guidance systems to acquire and intercept their targets. Such systems often use an optical tracking system based on receiving energy in the mid-infrared region, at wavelengths around three to four micrometers. Examples of such systems include air-to-air, heat-seeking guided missiles, and smart munitions such as guided bombs that track a target by laser back scatter. In all of these devices, it is necessary to protect the relatively fragile optical tracking systems from heat and impact events. Protection of the optics requires the use of a highly impact-resistant window that is suitably transparent in the mid infrared region.

One of the best materials for protective windows and domes is α-alumina in its single crystal form, known as sapphire. Sapphire is transparent to electromagnetic radiation having a wavelength up to 4 μm, and is extremely impact resistant at ambient temperature. Synthetic sapphire crystals can be grown in cylindrical ingots of many inches in diameter, and then cut and machined to shape for the final application. However, sapphire exhibits significantly lower strength as temperature increases, especially above about 600° C., limiting its use in hypersonic applications. Furthermore, the machining process necessary to form a final shape from a sapphire ingot is difficult to implement at a reasonable cost.

Other window materials exist, including magnesium fluoride, zinc sulfide, gallium phosphate, yttria, aluminum oxynitride and spinel. All of these materials can be processed to near net shape, but may have limitations in the combination of properties required for missile applications. For example, magnesium fluoride, zinc sulfide, and gallium phosphate may be more suitable for IR windows used at wavelengths of 10-12 microns, while yttria, aluminum oxynitride and spinel may work better for windows used at IR wavelengths of 3-5 microns. Other issues with these materials may include such problems as sensitivity to water droplet impact, which can cause the window to shatter at hypersonic speeds. Reducing grain size in single phase materials may provide some incremental enhancements in mechanical properties. However, a window or dome material must provide breakthroughs in strength, thermal shock resistance, and processability to allow projectiles to perform at hypersonic speeds.

Therefore it is desirable that a new material be identified for use in manufacturing protective windows that are transparent in the mid-IR frequencies. This material should have enhanced strength and processability over single crystal sapphire. There is also a need for processes for reliable and relatively economic manufacture of structures from such materials.

BRIEF DESCRIPTION

In accordance with one embodiment of the present invention, a structure made from a nano-composite material that is capable of transmitting infrared light is provided. The nano-composite material comprises a matrix material containing particles of a nano-dispersoid, wherein the largest dimension of the particles is less than about 100 nm across the direction of the incoming light.

In accordance with another embodiment of the present invention, the nano-composite material itself is provided, which may be used as a base material for use in making a range of structure or devices.

In accordance with another embodiment of the present invention, a method of making a structure from a nano-composite material comprises blending a precursor matrix powder and a precursor nano-dispersoid powder, pressing the blend into a green shape, heating the green shape to fuse the blend into a bisque-fired shape, and sintering the bisque-fired shape in a press to form a final structure.

In accordance with another embodiment of the present invention, another method of making a structure from a nano-composite comprises blending a precursor matrix powder and a precursor nano-dispersoid powder. The blend is then pressed into a green shape, and the green shape is heated to fuse the blend into a bisque-fired shape. The bisque-fired shape is sintered under hot isostatic pressure to form a final structure. In one aspect, the bisque-fired shape may be pre-sintered to a theoretical density of about 95% or greater prior to being sintered. In another aspect, the bisque-fired shape may be sealed in a glass or metal coating prior to being sintered.

In accordance with another embodiment of the present invention, another method of making a structure from a nano-composite comprises pressing a precursor matrix powder into a green shape, heating the green shape to fuse the precursor matrix powder into a nano-porous structure, and exposing the nano-porous structure to a polymer precursor solution. The nano-porous structure is then heated to form a nano-dispersoid from the polymer precursor, and sintered in a gas mixture under hot isostatic pressure to form a final structure, as discussed above.

In accordance with another embodiment of the present invention, another method of making a structure from a nano-composite comprises coating a precursor matrix powder with a sol-gel precursor to form a coated precursor matrix powder, pressing the coated precursor matrix powder into a green shape, and heating the green shape to form a nano-dispersoid from the sol-gel precursor. The green shape is then heated to fuse the powder into a bisque-fired shape. The bisque-fired shape is sintered under hot isostatic pressure to form a final structure, as discussed above.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
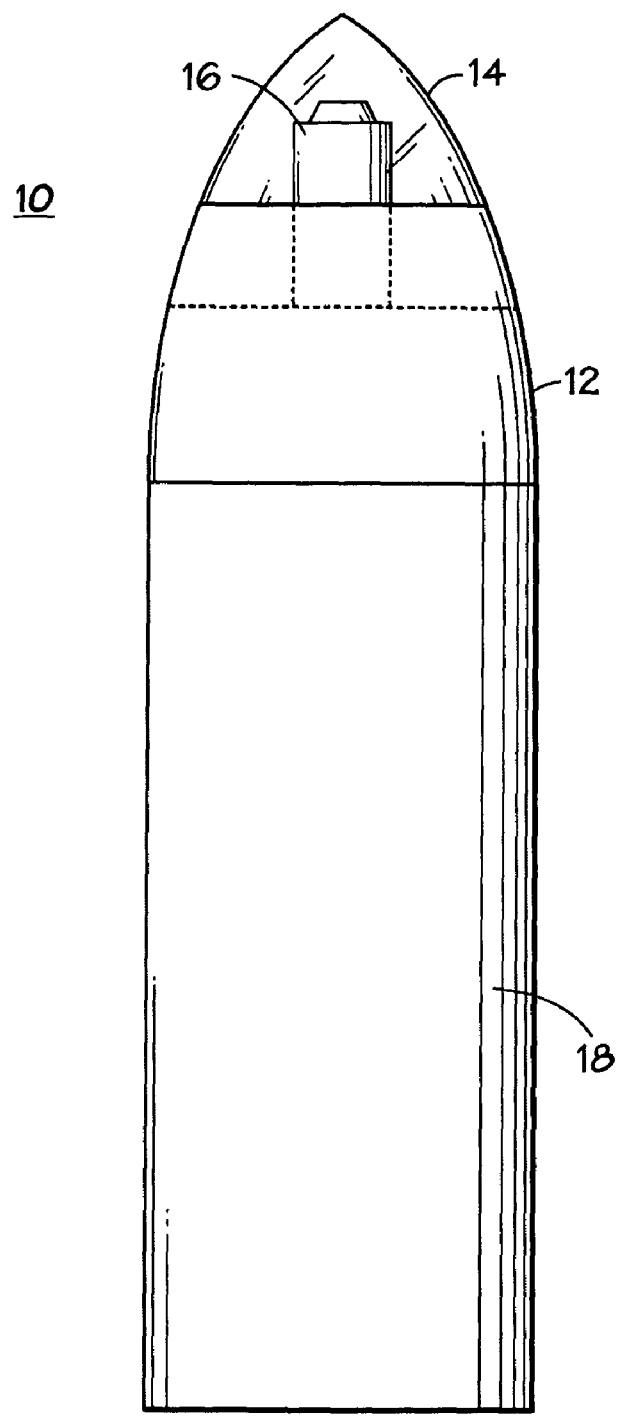
FIG. 1 shows a projectile having a transparent, impact resistant nose cone, in accordance with exemplary embodiments of the current technique.

FIG. 1 illustrates a projectile assembly 10 in accordance with exemplary embodiments of the current invention. The assembly 10 has, at the forward end thereof, an ogive-shaped nose cone assembly 12, including a transparent, highly impact-resistant window 14 made from materials discussed in exemplary embodiments of the current invention. The window 14 covers and protects optical sensors 16, which may serve for target tracking and acquisition. The projectile body 18 beneath the nose cone assembly 12 may carry an explosive payload. Such projectiles may be used in various types of applications, including heat-seeking, air-to-air missiles, actively targeted free-falling bombs, or optically guided artillery shells, among others. In other embodiments, the materials discussed below may be used to form windows or lenses for use in other types of aggressive environments, such as process instrumentation in high pressure, corrosive, or abrasive applications.

Figure 2:
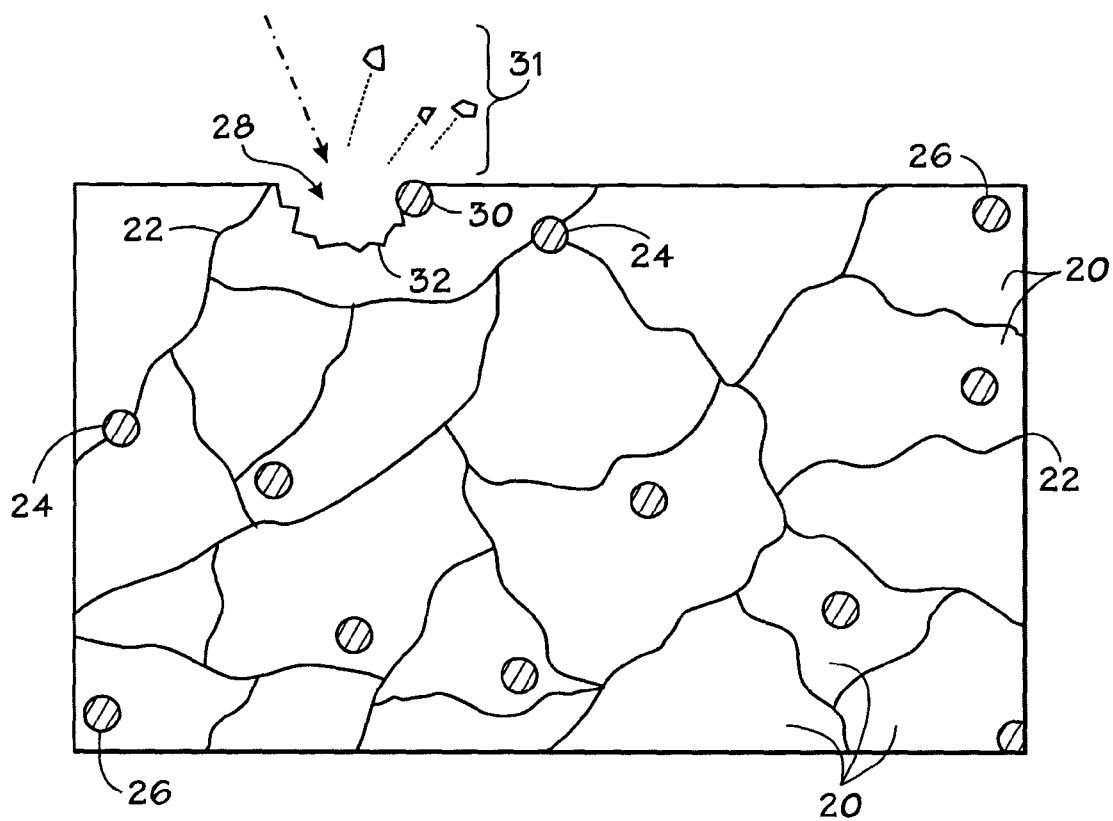
FIG. 2 shows that the incorporation of nano-dispersoid particles in a material may limit the damage sustained by a material upon impact, in accordance with embodiments of the current technique.

FIG. 2 is a structural diagram representative of exemplary embodiments of the current invention. The matrix material is made up of fused polycrystalline grains 20. Nano-dispersoid particles 24, 26 are incorporated into the matrix to improve impact resistance. The properties of exemplary materials which may be used in exemplary embodiments are shown in Table 1, below.

sidered depending upon the particular application. For example, cubic-zirconia ($cZrO_2$) may not have the thermal shock resistance (R') needed for hypersonic applications and yttrium oxide ($Y_2O_3$) may have too low strength for many applications. A presently contemplated material for use as a matrix in exemplary embodiments for IR window applications is spinel ($MgAl_2O_4$), which has a cubic crystalline structure, high strength, and may be formed into transparent structures. While spinel is attractive for many high impact applications, it may not have the strength to withstand hypersonic impacts without cracks forming along grain boundaries 22. These cracks could lead to the formation of large surface pits after an impact, and may cause complete failure of the structure.

The matrix may be strengthened by the incorporation of nano-dispersoid particles, in accordance with embodiments of the present invention. The particles may be located at the boundaries 24 between grains 20 or within 26 the polycrystalline grains 20. The nano-dispersoid particles 24, 26 are harder than the matrix material, and act as stress risers. This changes the failure mode of the matrix from inter-granular to trans-granular. As shown in FIG. 2, a high speed impact 31 at the surface may lead to the formation of a crack 32 in the structure. This crack 32 is diverted away from the grain boundary 22 to a nearby nano-dispersoid particle 30, forming a small surface pit 28.

For IR window applications, the nano-dispersoid particles 24, 26 are made from a material that is transparent in mid-IR wavelengths, and that is preferably resistant to oxidation and water, and chemically compatible with the matrix material. In exemplary embodiments, these particles may be made from cubic-boron nitride (c-BN), silicon nitride ($Si_3N_4$), silicon

TABLE 1

Optical, thermomechanical, and erosion-resistance properties data at room temperature for potential infrared window materials components.[1]

| Material | Density (g/cc) | Optical | | | Thermomechanical | | Erosion Resistance Knoop |
|---|---|---|---|---|---|---|---|
| | | Transmit range (μm) | Ave. $\gamma_{abs}$ 3-5 μm | n at 3.39 μm | Strength (MPa) | R' (kW/m) | hardness (kg/mm²) |
| Matrix | | | | | | | |
| α-$Al_2O_3$ | 3.986 | 0.19-5.2 | 0.17 | 1.696 | 500 | 4.2 | 2200 |
| $MgAl_2O_4$ | 3.58 | 0.21-5.3 | <0.16 | 1.658 | 300 | 2.7 | 1390 |
| $Y_3Al_5O_{12}$ | 4.55 | 0.21-5.2 | 0.17 | 1.777 | 300 | 1.5 | 1370 |
| $cZrO_2$ | 6 | 0.35-7 | <1 | 2.070 | 620 | 0.39 | 990 |
| $Y_2O_3$ | 5.013 | 0.29-7.1 | 0.05 | 1.869 | 150 | 1.25 | 875 |
| MgO | 3.58 | 0.16-9 | 0.02 | 1.683 | 130 | 1.91 | 690 |
| Reinforcement | | | | | | | |
| cBN | 3.48 | 0.2-6 | <8 | 2.051 | — | — | 4600 |
| SiC | 3.214 | 0.5-5 | 2.7 | 2.534 | — | — | 2880 |
| $Si_3N_4$ | 3.24 | 0.3-4.7 | 5 | 1.980 | — | — | 3400 |

[1]Note:
n is index of refraction, $\gamma_{abs}$ is light absorption coefficient, R' is the Hasselman mild thermal shock figure of merit.

Potential matrix materials are shown at the top of Table 1, but physical property considerations may limit the usefulness of some of these materials in certain applications. For example, the first matrix material, α-$Al_2O_3$, is a fused polycrystalline version of sapphire. Because the crystal structure of sapphire is anisotropic, and thus exhibits birefringence, grain boundaries may scatter light at certain wavelengths and reduce the transmission of the polycrystalline version of this material. For this reason, a more optimal choice for IR window applications may be selected so as to provide isotropic, cubic, crystalline structures, minimizing light scatter from grain boundaries. Additionally, other properties may be considered depending upon the particular application. For example, carbide (SiC), or a combination of these materials, as shown at the bottom of Table 1. Presently contemplated nano-composite materials are illustrated in Table 2, below.

In general, it may be preferable that in the nano-composite structure, both the grain size and the nano-dispersoid particles 24, 26 be kept small to avoid scattering of infrared light. Exemplary size ranges for embodiments of the current invention are shown in Table 2 as parameter $d_{max}$. The optimum size ranges are calculated to provide maximum transparency in exemplary embodiments of the current invention. The particle shape used is not limited to the spheres shown in FIG. 2.

Figure 3:
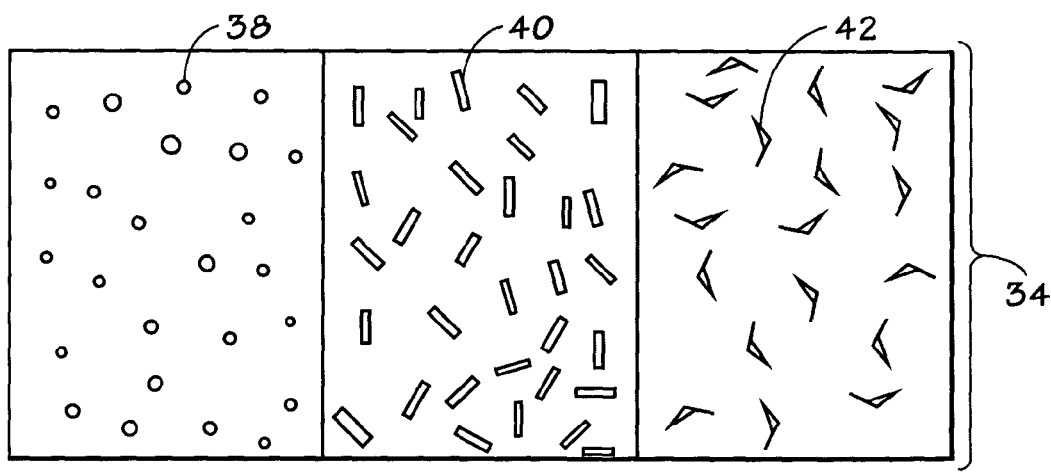
FIG. 3 shows a matrix material containing differently shaped nano-dispersoid particles, in accordance with exemplary embodiments of the current technique.

As shown in FIG. 3, the particles may be spheres 38, cylinders 40, whiskers 42, or a mixture of these shapes. For these non-symmetric shapes, $d_{max}$ is defined as the dimension of the longest axis of the particles in the direction of the light transmission. In an exemplary embodiment, the particles are whiskers generated by ball milling longer fibers during production of the materials.

TABLE 2

Maximum tolerable volume percents, v/o, of spherical reinforcement particles and maximum tolerable diameters, $d_{max}$.

| Matrix/ Reinforcement | Tolerable v/o with d = 50 nm | Tolerable v/o with d = 100 nm | Tolerable $d_{max}$ (nm) | Optimum $d_{max}$ (nm) |
|---|---|---|---|---|
| Spinel/cBN | 16 | 2.0 | 74 | 37-46 |
| Spinel/Si$_3$N$_4$ | 23 | 2.9 | 84 | 42-53 |
| Spinel/SiC | 3.8 | 0.48 | 46 | 23-29 |
| Spinel/MgO | 25 | 25 | 472 | 224-285 |
| Spinel/tZrO$_2$ | 15 | 1.9 | 72 | 36-45 |
| YAG/SiC | 4.2 | 0.52 | 47 | 23-30 |
| Y$_2$O$_3$/SiC | 4.7 | 0.59 | 49 | 24-31 |
| MgO/SiC | 3.8 | 0.48 | 46 | 23-29 |

In addition to controlling the grain and particles sizes, the total loading of particles, shown as parameter v/o in Table 2, may advantageously be kept below a maximum of about 25%, depending on the choice of materials and particle sizes. Also, above a volume loading of about 16%, the particles may touch to form a continuous network through the matrix during sintering, preventing complete densification of the matrix. This may lead to the incomplete elimination of voids, which scatter light and reduce transparency. Furthermore, it generally may be preferred that the particles be kept from agglomerating during production of the structure, because this also is likely to lead to a reduction in transparency. In an exemplary embodiment, SiC may be used as a reinforcing material in a spinel matrix, because SiC has good transparency and a lower coefficient of thermal expansion than spinel. Additionally, SiC is hard, relatively oxidation resistant, and has been shown to improve the strength of opaque structures when present as a nano-dispersoid.

Figure 4:
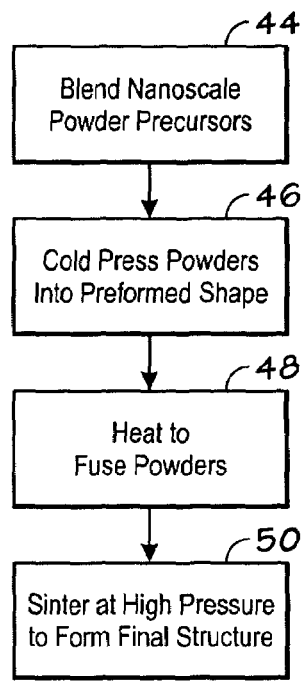
FIG. 4 is a process flow chart showing a technique for producing nano-composite materials, in accordance with embodiments of the current invention.
Figure 5:
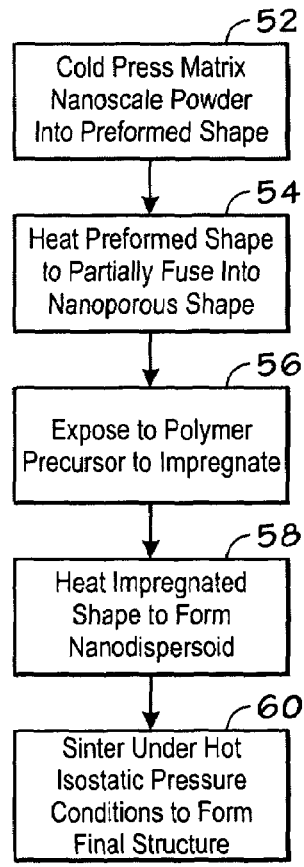
FIG. 5 is a process flow chart showing a technique for producing nano-composite materials by impregnation of a polymer precursor for the nano-dispersoid into a nano-porous structure, in accordance with an embodiment of the current invention.
Figure 6:
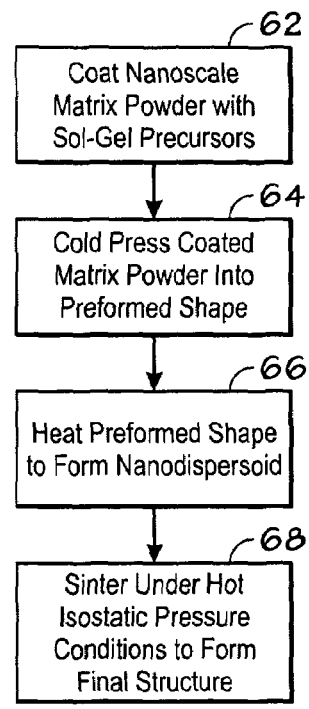
FIG. 6 is a process flow chart showing a technique for producing nano-composite materials by coating the matrix precursor powders with a sol-gel precursor of the nano-dispersoid, in accordance with an embodiment of the current invention.

The nano-composite materials may be produced by a number of techniques, as shown in FIGS. 4-6 for exemplary embodiments of the current invention. During production, it may be important to minimize reactions between the matrix and the reinforcing particles by using the lowest temperature for sintering that allows complete removal of porosity.

FIG. 4 is a flow chart illustrating one of an exemplary production processes that may be suitable in embodiments of the current technique to generate a nano-composite material. In block 44, the nano-scale powder precursors for the matrix and reinforcing phases are blended. In exemplary embodiments, this may be accomplished by the use of a ball mill to grind the powders together into an extremely fine dust. In other embodiments, the nano-scale powder precursors may be suspended in a liquid medium prior to milling. For larger parts, this dust may be further blended with a binder to avoid cracks in the final structure. Exemplary binders may include such materials as polyethylene glycol, polyvinyl alcohol, polyvinyl butyrol, and hydroxycellulose, among others. In exemplary embodiments, the binder may contain other components, such as plasticizers and flow enhancers, among others. In block 46, the powder blend is cold pressed into a green shape. In exemplary embodiments, this may be done by such techniques as injection molding, gel casting, slipcasting, and extrusion, among others. In an exemplary embodiment, the green shape is the ogive-shaped nose cone 14 previously discussed. See FIG. 1. In other embodiments, the green shape may be a window or lens. The green shape is heated under controlled atmosphere conditions, generally air or oxygen, to burn out any binder present and lightly fuse the powders, forming a bisque-fired structure as shown in block 48. This structure may be further processed, such as by soaking in base to remove chloride residues, prior to final sintering. In block 50, the bisque-fired structure is sintered to form the final structure.

In exemplary embodiments, the final sintering step may be performed in a high-temperature, high-pressure mechanical press. In other embodiments, the sintering may be performed under hot isostatic pressure (HIP) conditions, in which a high pressure gas may be used to compress the part to the final density. If HIP conditions are used for sintering, the structure may be sealed to close off external pores, which may allow the external gas pressure to increase the density of the final part. In embodiments of the current invention, the part may be sealed by sintering to about 95% or greater of the final theoretical density to form a pre-sintered shape. In other embodiments, the part may be sealed with a glass or metal coating prior to sintering under HIP conditions. In exemplary embodiments, argon is used as the main component of the high pressure atmosphere. In other embodiments, oxygen is added to the argon to minimize oxygen loss from the materials during sintering. In exemplary embodiments, sintering may be done in two, or more, time/temperature steps to maximize the density of the final structure. For example, an initial firing may be done to about 1300° C. for a period of about 1 second, followed by a temperature of about 1150° C. for about 15 hours. One skilled in the art will recognize that the exact temperature and times used will depend heavily on the materials chosen. This procedure may allow for maximum densification while preventing excessive growth in grain size. The maximum temperature used in the final sintering step is kept to the minimum necessary for complete densification to minimize reactions between the powders. For an exemplary structure made from a spinel matrix containing SiC nano-dispersoid particles, this temperature may be, for example, between 1450° C. and 1650° C.

FIG. 5 is a flow chart illustrating another exemplary embodiment of the production process that may be suitable to form structures from nano-composite materials. In block 52, the powder precursor of the pure matrix material is pressed into a green shape. As discussed above with respect to FIG. 4, a binder may be blended with the pure matrix material to prevent cracks from forming in larger shapes. In exemplary embodiments the green shape may be an ogive-shaped nose cone 14, a window, or a lens, as discussed with respect to FIG. 1. The green shape is heated to about 600° C. to burn out any binder used and to partially sinter the green shape into a nano-porous version of the final shape, as shown in block 54. The time and temperature of the partial sintering will preferably be controlled to prevent forming pores that are too small to allow diffusion of a polymer solution into the porous structure, while providing sufficient strength to the structure to survive stresses from impregnation. In block 56, this nano-porous shape is exposed to a solution of a polymer precursor for the nano-dispersoid, which is carried into the structure, such as by capillary action. In exemplary embodiments, the solution may contain a polysiloxane polymer. In other embodiments, the solution may contain organic polymers, inorganic polymers, organic-inorganic block copolymers, or mixtures of these. In block 58, the nano-porous shape, impregnated with the polymer solution, is heated to decompose the polymer, leading to the formation of the nano-dispersoid particles. In block 60, the nano-porous shape, containing the dispersed nano-particles, is sintered to form the final structure, as described with reference to FIG. 4.

FIG. 6 is a flow chart illustrating another production technique which may be suitable in exemplary embodiments of the current process. In block 62, the nano-scale matrix powder precursor is coated with a sol-gel solution containing a polymer precursor of the nano-dispersoid. As described with reference to FIG. 5 above, in exemplary embodiments this polymer precursor may be a polysiloxane, or other organic, inorganic, or mixed polymers. In exemplary embodiments, the coating may be performed by mixing the precursor powder with one of the sol-gel reactants, then adding another sol-gel reactant to form the final sol-gel coating on the precursor powder particles. In other embodiments a sol-gel solution at a low pH may be mixed with the powder during the milling process, and then a reagent may be either added or formed in-situ, to raise the pH and force precipitation of the final sol-gel. An example of an in-situ reagent formed in embodiments of the current invention would be ammonia, which may be formed by the decomposition of urea. Those skilled in the art will recognize that other techniques may be used to create the sol-gel. After the precursor powder is coated, in block 64 it is pressed into a green shape. In exemplary embodiments, the coated powder may be formed into a green shape by slip-casting, gel-casting, or pressure filtration. Those skilled in the art will recognize that other techniques may be used to form the green shape from the coated powder. As discussed above, in exemplary embodiments the green shape may be an ogive-shaped nose cone 14, a window, or a lens. See FIG. 1. The green shape is heated in block 66 to burn off any binder used and to decompose the polymer precursor, forming particles of the nano-dispersed reinforcing phase. In block 68, the green shape containing the nano-dispersoid particles is sintered to form the final structure, as described for FIG. 4.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A structure, comprising:
a nano-composite material capable of transmitting infrared light, the nano-composite comprising:
a sintered matrix material comprising polycrystalline grains; and
particles of a nano-dispersoid disposed within the grains, between the grains, or a combination thereof, wherein the largest dimension of the particles of the nano-dispersoid is about 100 nm across the direction of light transmission; and
wherein the structure is substantially transparent to infrared light and is substantially non-porous.

2. The structure of claim 1, wherein the particles of the nano-dispersoid are generally spherical, ellipsoidal, cylindrical, or a combination thereof.

3. The structure of claim 1, wherein the largest dimension of the particles of the nano-dispersoid is about 60 nm across the direction of light transmission.

4. The structure of claim 1, wherein the sintered matrix material is selected from the group consisting of $MgAl_2O_4$, $Y_3Al_5O_{12}$, cubic-$ZrO_2$, $Y_2O_3$, MgO, and combinations thereof.

5. The structure of claim 1, wherein the particles of the nano-dispersoid are selected from the group consisting of cubic-BN, SiC, $Si_3N_4$, and combinations thereof.

6. The structure of claim 1, wherein the structure is a nose cone.

7. The structure of claim 1, wherein the structure is a window.

8. The structure of claim 1, wherein the structure is a lens.

9. The structure of claim 1, wherein the sintered matrix material comprises an optically isotropic structure.

10. The structure of claim 1, wherein the sintered matrix material comprises a cubic structure.

11. A nano-composite material capable of transmitting infrared light, comprising:
a sintered matrix material comprising polycrystalline grains; and
particles of a nano-dispersoid disposed within the grains, between the grains, or a combination thereof, wherein the largest dimension of the particles of the nano-dispersoid is about 100 nm across the direction of light transmission; and
wherein the nano-composite material is substantially transparent to infrared light and is substantially non-porous.

12. The nano-composite material of claim 11, wherein the particles of the nano-dispersoid are generally spherical, ellipsoidal, cylindrical, or a combination thereof.

13. The nano-composite material of claim 11, wherein the largest dimension of the particles of the nano-dispersoid is about 60 nm across the direction of light transmission.

14. The nano-composite material of claim 11, wherein the sintered matrix material is selected from the group consisting of $MgAl_2O_4$, $Y_3Al_5O_{12}$, cubic-$ZrO_2$, $Y_2O_3$, MgO, and combinations thereof.

15. The nano-composite material of claim 11, wherein the particles of the nano-dispersoid are selected from the group consisting of cubic-BN, SiC, $Si_3N_4$, and combinations thereof.

16. The nano-composite material of claim 11, wherein the sintered matrix material comprises an optically isotropic structure.

17. The nano-composite material of claim 11, wherein the sintered matrix material comprises a cubic structure.

18. The nano-composite material of claim 11, wherein the nano-composite material is substantially free of light scattering.

* * * * *